United States Patent [19]
Morita

[11] Patent Number: 5,315,298
[45] Date of Patent: May 24, 1994

[54] APPARATUS AND METHOD OF DISPLAYING CAR-NAVIGATING MAP

[75] Inventor: Kenji Morita, Tokyo, Japan
[73] Assignee: Clarion Co., Ltd., Tokyo, Japan
[21] Appl. No.: 964,449
[22] Filed: Oct. 21, 1992
[30] Foreign Application Priority Data
Oct. 29, 1991 [JP] Japan .................... 3-311671
[51] Int. Cl.$^5$ ............................ G08G 1/123
[52] U.S. Cl. .................... 340/995; 340/990; 364/449
[58] Field of Search ............ 340/990, 995; 73/178 R; 364/449, 443, 444

[56] References Cited
U.S. PATENT DOCUMENTS

| | | | |
|---|---|---|---|
| 4,571,684 | 2/1986 | Takanabe et al. | 340/990 |
| 4,660,037 | 4/1987 | Nakamura | 340/990 |
| 4,675,676 | 6/1987 | Takanabe et al. | 340/990 |
| 5,084,822 | 1/1992 | Hayami | 340/990 |

FOREIGN PATENT DOCUMENTS

| | | | |
|---|---|---|---|
| 0152310 | 6/1989 | Japan | 340/995 |
| 0223308 | 9/1989 | Japan | 340/995 |

*Primary Examiner*—Brent Swarthout
*Attorney, Agent, or Firm*—Nields & Lemack

[57] ABSTRACT

A car-navigating map displaying apparatus and method which produces a continuous representation of a road is disclosed. The apparatus comprises a storage storing data of a map including a plurality of areas at different levels of detailedness, a determinant determining whether or not there is a boundary of the areas having different levels of detailedness on the screen of a display, and controller controlling the display to display the entire map on the screen at a lower level of detailedness when the determinant determines that there is the boundary of the areas on the screen of the display.

4 Claims, 5 Drawing Sheets

APPARATUS AND METHOD OF DISPLAYING CAR-NAVIGATING MAP

BACKGROUND OF THE INVENTION

1. Field of the Invention

The present invention relates to an apparatus and a method of displaying a car-navigating map.

2. Description of the Related Art

In making a car-navigating map of an area including a city, level of detailedness of the map is usually determined by the population of the city. For example, levels of detailedness of car-navigating maps for predetermined areas are classified so that a somewhat detailed car-navigating map is prepared for an area including a city of a population of 200,000 or more and a more detailed car-navigating map is prepared for an area including a city for which The Japanese Geographical Survey Institute issued a map of a scale of 1/10,000.

When a car-navigating map displaying system, for example, establishes the three levels of level A, level B and level C of detailedness and a motorcar goes to an area of level B through an area of level A or to an area of a lower level, for example, from the area of level B to the area of level C lower than level B, there is a problem that a representation of the same road to be traveled by the motorcar may be discontinued between the areas of the different levels.

This problem will be described with reference to FIGS. 8 and 9 hereinafter. As shown in FIGS. 8 and 9, it is assumed that the system displays all of roads b and c at level B and continues to display the roads b at level B but displays none of the roads at level C. When a automotive vehicle or motorcar X now travels along a road c1 toward north and a current position of the motorcar X is in the area of level B as shown in FIG. 8, the system displays the road c1. However, the system discontinues displaying the road c1 in the area of level C as the motorcar X approaches a boundary between the areas of levels B and C as shown in FIG. 9. Thus, such discontinuity in displaying a road due to a difference between levels of detailedness may mislead a driver of the motorcar X to judge that a traveled road reaches an end.

SUMMARY OF THE INVENTION

An object of the present invention is to provide an apparatus and a method of displaying a car-navigating map. In order to achieve the object, a car-navigating map displaying apparatus having a position detecting means for detecting a current position of a vehicle and a display means for displaying a map including an area including the current position of the vehicle, comprises means for storing map data of at least two areas represented at different levels of detailedness, means for determining whether or not the areas having the different levels of detailedness are concurrently displayed when the display means displays the area including the current position, and a controller controlling the display means to display all of the areas at level of detailedness of one of the areas having a lower level of detailedness when the determining means determines that the areas are concurrently displayed.

A method of displaying a map for a car-navigating map displaying apparatus, the car-navigating map displaying apparatus having a position detecting means for detecting a current position of a vehicle, a storage means for storing map data of at least two areas traveled by the vehicle represented at different levels of detailedness and a display means for displaying a map including an area including the current position of the vehicle, comprises the steps of determining level of detailedness of map data of the area including the current position of the vehicle during travel of the vehicle, causing the display means to display a map at the determined level of detailedness, determining whether or not a screen of the display means currently displays maps having different levels of detailedness, determining whether level of detailedness of a next area to be traveled by the vehicle is higher or lower than current level of detailedness, displaying the maps at the lower level of detailedness when level of detailedness of the next area is determined to be lower than current level of detailedness, and switching level of detailedness of a representation of a map in response to the magnitudes of areas present on the screen of the displaying means when level of detailedness of the next area is determined to be higher than current level of detailedness.

The present invention can eliminate a discontinuity of the representation of a road traveled by the vehicle.

DESCRIPTION OF THE PREFERRED EMBODIMENTS

Embodiments of the present invention will be described with reference to the accompanying drawings hereinafter.

Figure 1:
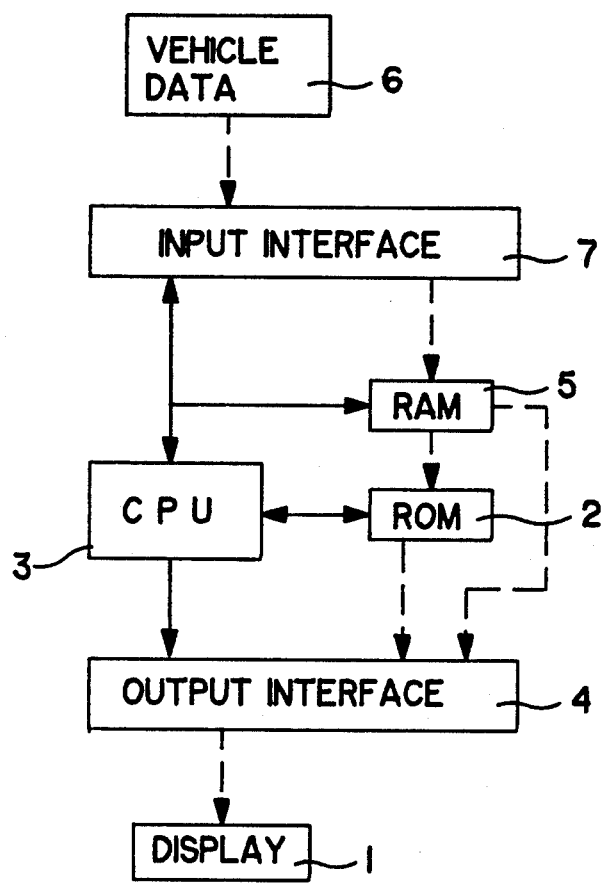
FIG. 1 is a block diagram of a car-navigating map displaying apparatus according to a first embodiment of the present invention.

FIG. 1 is a block diagram of a car-navigating map displaying apparatus according to a first embodiment of the present invention. A display 1 is controlled by a central processing unit or controller 3 comprising a microprocessor via an output interface 4 to display a map of a predetermined area on the basis of map data stored in a ROM 2. The controller 3 receives position data of a automotive vehicle or motorcar having the car-navigating map displaying apparatus from a position sensor 6 via an input interface 7 and store the positional data in a RAM 5. The controller 3 controls the display 1 to point out a current position of the present motorcar X on maps on the basis of the positional data stored in the RAM 5.

The map data stored in the ROM 2 are classified into levels A, B and C of detailedness. The controller 3 determines whether or not there is a boundary between areas of levels of detailedness on the screen of the display 1.

When there is the boundary on the screen of the display 1, the controller 3 controls the display 1 to operate at a lower level.

Figure 4:
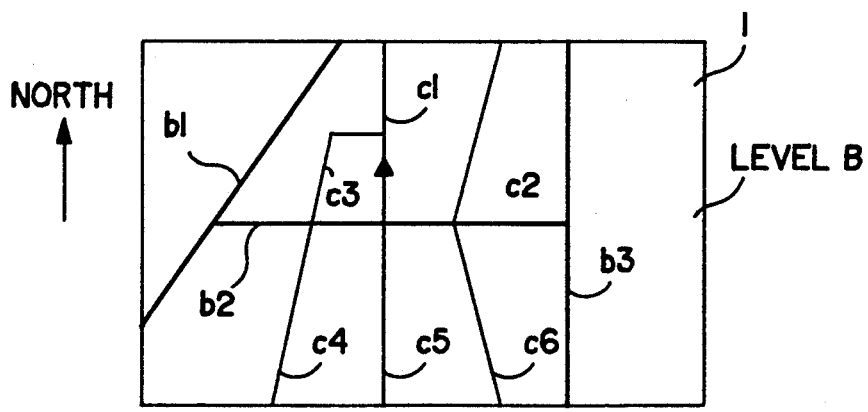
FIG. 4 illustrates operation of the car-navigating map displaying apparatus of FIG. 1.
Figure 5:
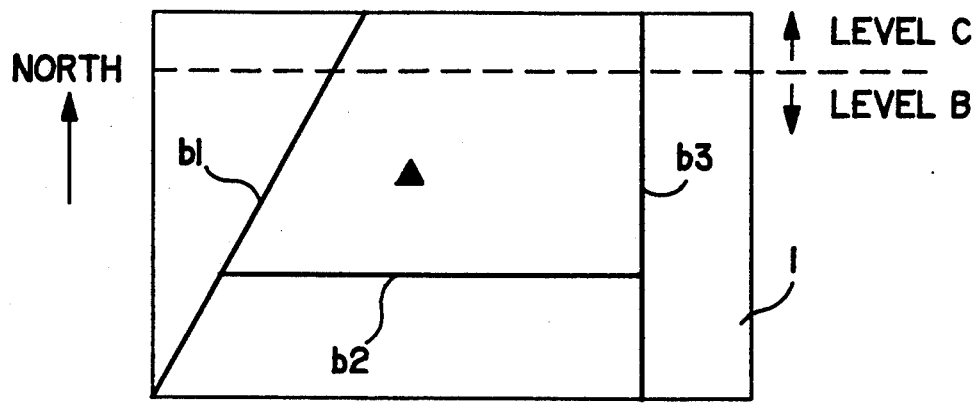
FIG. 5 illustrates operation of the car-navigating map displaying apparatus of FIG. 1.
Figure 9:
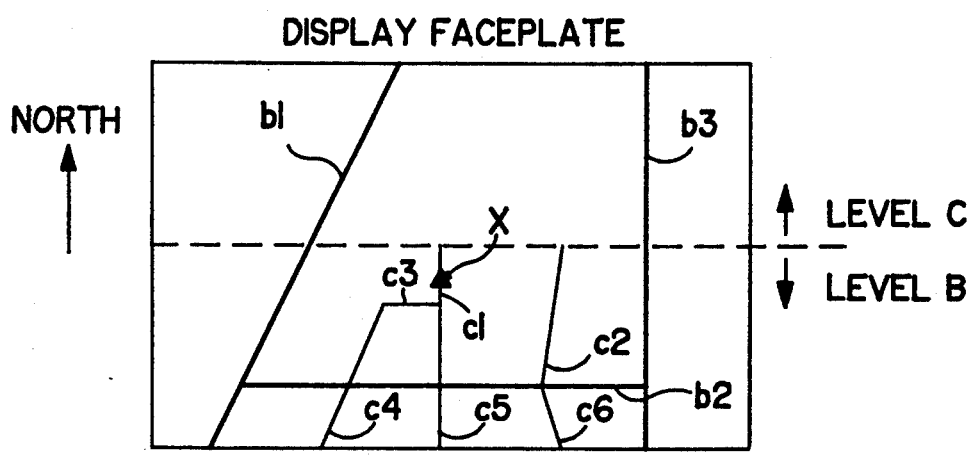
FIG. 9 illustrates operation of the prior art car-navigating map displaying apparatus.

As shown in FIG. 4, the display 1 displays a road c1 when the motorcar X is in an area of level B. On the other hand, when the screen of the display 1 concurrently displays an area of level C in addition to the area of level B, the controller 3 determines that there is a boundary of areas of different levels on a screen of the display 1 and controls the display 1 to operate at a lower level, i.e. level C in this case. Thus, the traveled road c1 disappears from the screen of the display 1 as shown in FIG. 5 and a discontinuity in the representation of a road as shown in FIG. 9 is eliminated. If it is previously described in an operation manual that changing level of detailedness of a display of a car-navigating map to a lower level may discontinue displaying a traveled road, a user of the car-navigating map displaying apparatus can understand the discontinuity due to a change of level of detailedness without confusion.

Figure 6:
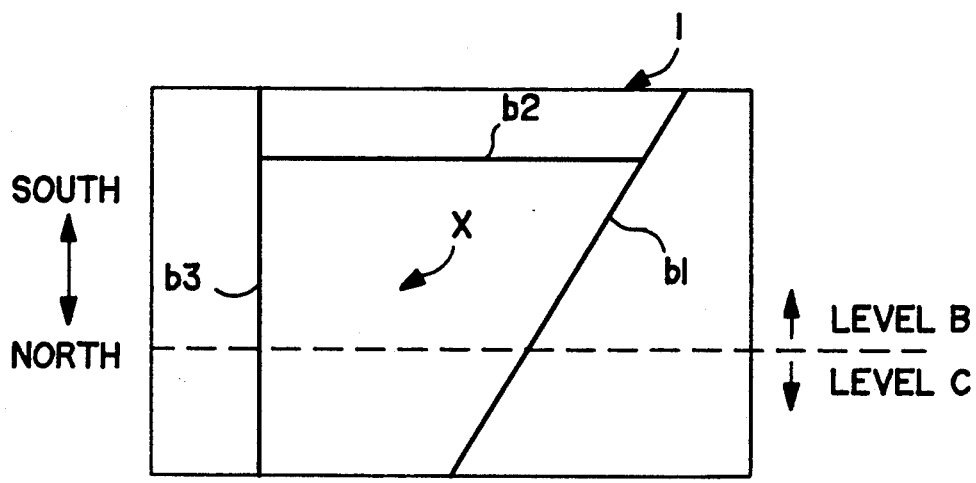
FIG. 6 illustrates operation of the car-navigating map displaying apparatus of FIG. 1.
Figure 7:
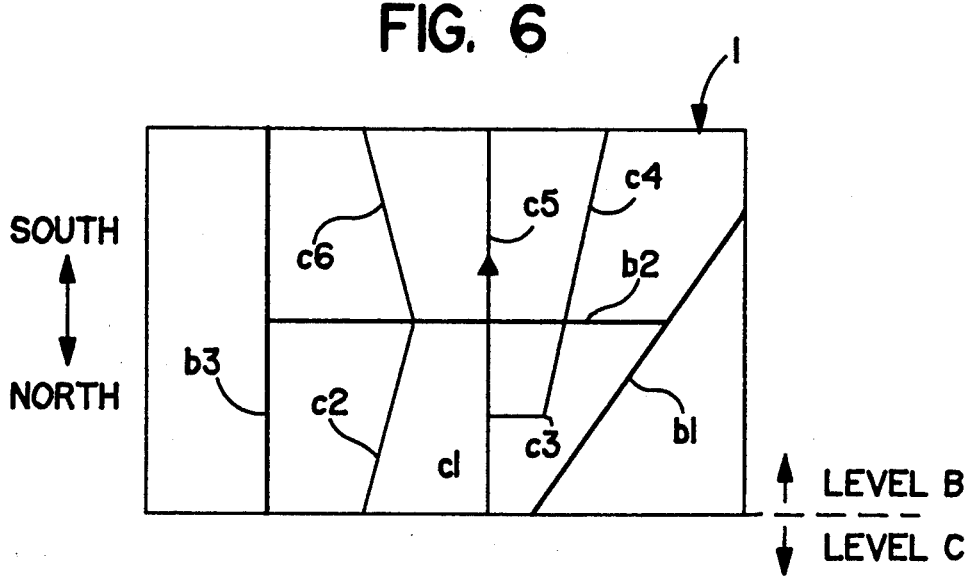
FIG. 7 illustrates operation of the car-navigating map displaying apparatus of FIG. 1.
Figure 8:
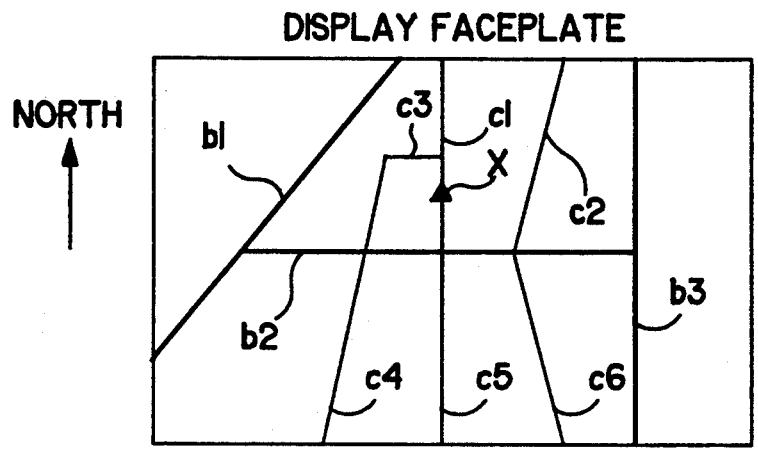
FIG. 8 illustrates operation of a prior art car-navigating map displaying apparatus.

On the other hand, when the apparatus switches level of detailedness of the map to a higher level, the apparatus continues displaying the map at level C even if the motorcar X has passed into the area of level B, until the entire screen of the display 1 is to display the map at level B, as seen in FIGS. 6 and 7.

Figure 2:
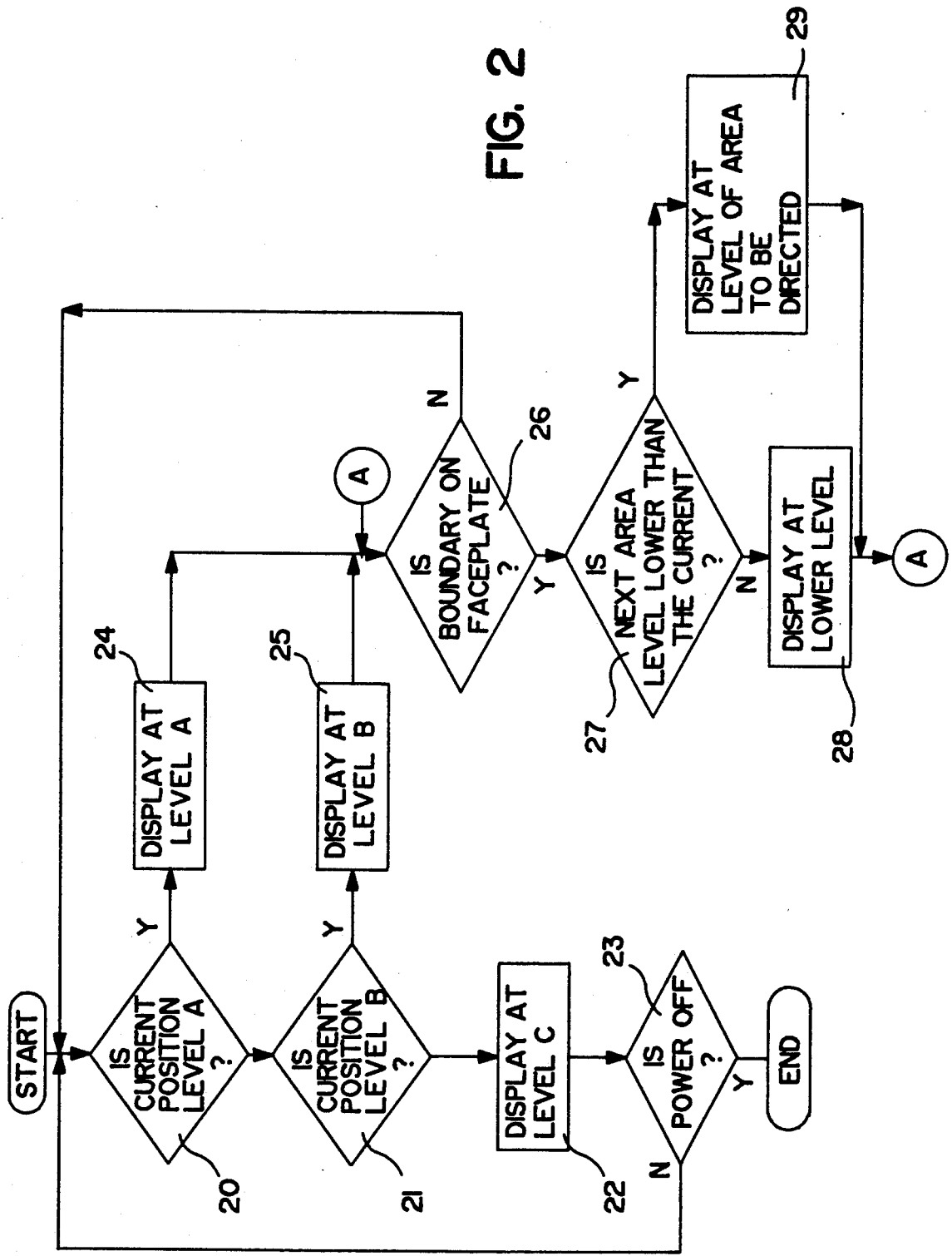
FIG. 2 is a flowchart of the car-navigating map displaying apparatus of FIG. 1.

Operation of the apparatus will be described with reference to FIG. 2 hereinafter.

The controller 3 determines level of detailedness of a current traveled area at STEP 20 or 21 and controls the display 1 to display this area at a determined level at STEP 24, 25 or 22. The controller 3 determines at STEP 23 whether or not an electric power is off at, when the display 1 currently operates at level C. When the electric power is not off, the controller 3 repeats the determination of level of detailedness. When the display 1 operates at level A or B, the controller 3 determines at STEP 26 whether or not there is a boundary of areas of different levels of detailedness on the screen of the display 1 and at STEP 27 further determines whether or not a next area to be traveled by the motorcar X has a lower level of detailedness. When level of detailedness of the next area is lower, the controller 3 controls the display 1 to operate at level of the next area at STEP 29. On the other hand, when level of detailedness of the next area is not lower, the controller 3 controls the display 1 to continue the current level of detailedness at STEP 28.

When the motorcar X passes into an area of a higher level of detailedness, the display 1 continues operating at a lower level even if almost all of the screen of the display 1 displays the area of a higher level.

Figure 3:
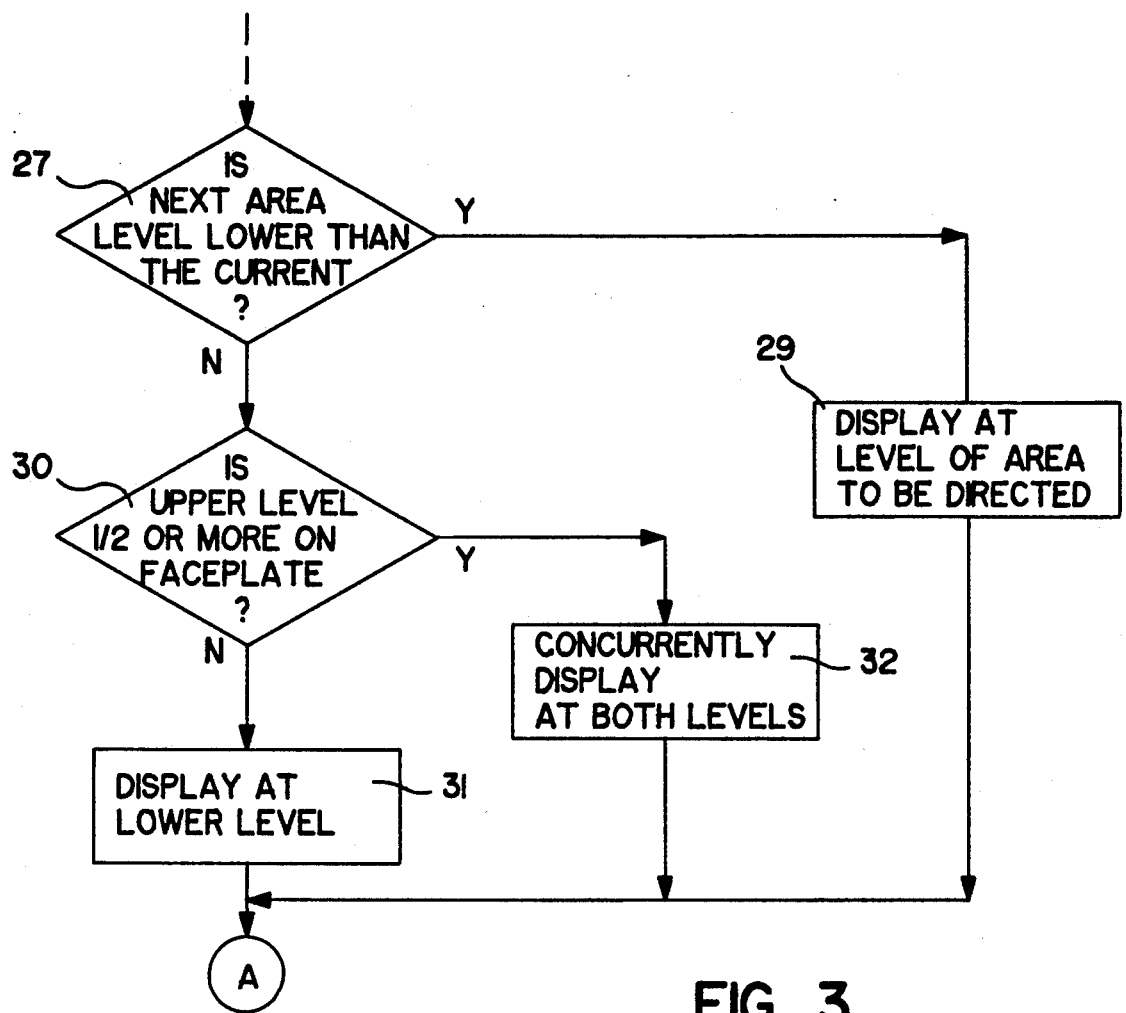
FIG. 3 is a flowchart of a car-navigating map displaying apparatus according to a second embodiment of the present invention.

In a car-navigating map displaying apparatus according to a second embodiment of the present invention as shown in FIG. 3, the display 1 displays the areas of different levels of detailedness at both the levels when an area of a higher level of detailedness occupied half or more of the screen of the display 1. That is, when level of detailedness of the next area is not lower, the controller 3 determines at STEP 30 whether or not the area of the higher level of detailedness occupied half or more of the screen. When the area of the higher level of detailedness occupied half or more of the screen, the display 1 concurrently displays at STEP 32 the areas of the lower and higher levels of detailedness at both the levels. On the other hand, when the area of the higher level of detailedness does not reach half of the screen, the display 1 operates at the lower level of detailedness at STEP 31. In this embodiment, the display may display a traveled road as if the road would have an end. However, the end of the road appears in the direction opposite to a direction of the travel of the motorcar, so that there is actually no problem. In the second embodiment, the display 1 operates at the higher level of detailedness when the area of the higher level of detailedness occupied half or more of the screen of the display 1.

The present invention is not rigidly restricted to the embodiments described above. It is to be understood that a person skilled in the art can easily change and modify the present invention without departing from the scope of the invention defined in the appended claims.

What is claimed is:

1. A method of displaying a map for a car-navigating map displaying apparatus, the car-navigating map displaying apparatus having a position detecting means for detecting a current position of a vehicle, a storage means for storing map data of at least two areas traveled by the vehicle represented at different levels of detailedness and a display means for displaying a map representing an area including the current position of the vehicle, the method of displaying a map comprising the steps of:

determining level of detailedness of map data of the area including the current position of the vehicle during travel of the vehicle;

causing said display means to display a map at the determined level of detailedness;

determining whether or not a screen of said display means currently displays maps having different levels of detailedness;

determining whether level of detailedness of a next area to be traveled by the vehicle is higher or lower than current level of detailedness;

displaying the maps at the lower level of detailedness when level of detailedness of said next area is determined to be lower than current level of detailedness; and switching level of detailedness of a representation of a map in response to the magnitudes of areas present on the screen of said displaying means when level of detailedness of said next area is determined to be higher than current level of detailedness.

2. The method of displaying a map as recited in claim 1, wherein said step of switching level of detailedness comprises the steps of:

displaying all of the areas at the lower level of detailedness when a representation on the screen of the area having the higher level of detailedness is smaller than a representation on the screen of the area having the lower level of detailedness; and displaying each of the areas at a corresponding one of the levels of detailedness when the representation on the screen of the area having the higher level of detailedness is larger than the representation on the screen of the area having the lower level of detailedness.

3. The method of displaying a map as recited in claim 1, wherein said step of determining whether or not the maps of the different levels of detailedness are currently displayed comprises the step of:

detecting a boundary of the areas represented at the different levels of detailedness.

4. The method of displaying a map as recited in claim 1, wherein said storage means stores ranks of levels of detailedness of map data represented at the different levels of detailedness and determines levels of detailedness of the map data in response to the ranks and causing said display means to display the maps at the determined levels of detailedness.

* * * * *